May 8, 1956     R. E. BROWNING     2,744,410
INDUCTION TYPE WIND TUNNEL
Filed March 13, 1952
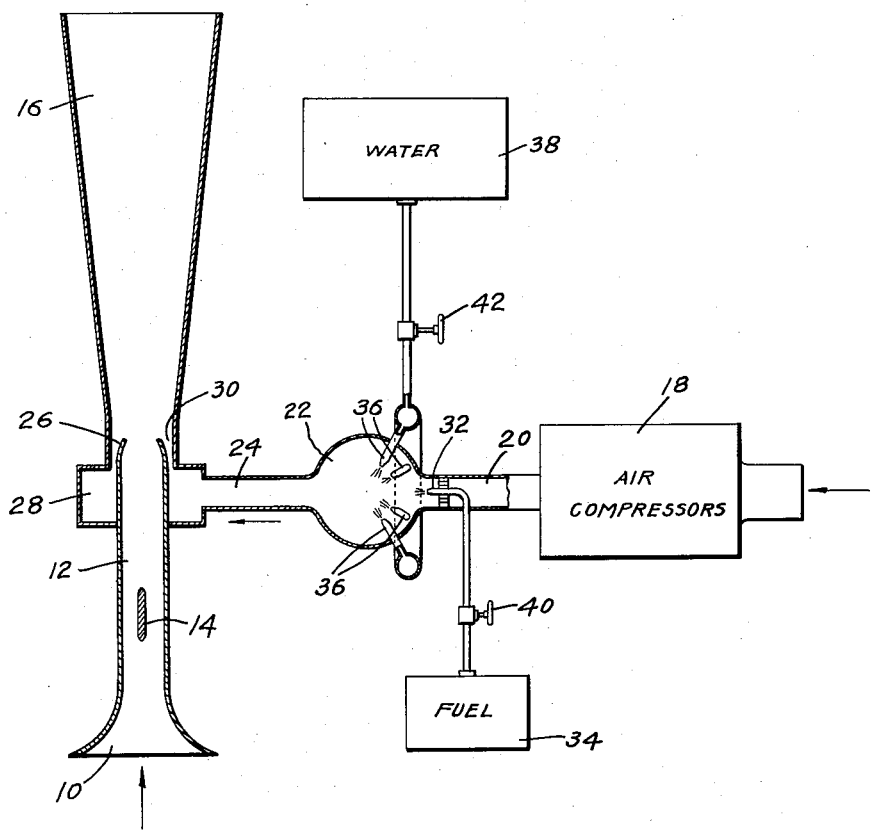
INVENTOR.
Rowland E. Browning.
BY
D. B. Snyder
A. R. McCrady
ATTORNEYS

United States Patent Office 2,744,410
Patented May 8, 1956

2,744,410

INDUCTION TYPE WIND TUNNEL

Rowland E. Browning, Fairview Park, Ohio

Application March 13, 1952, Serial No. 276,432

2 Claims. (Cl. 73—147)

(Granted under Title 35, U. S. Code (1952), sec. 266)

The invention described herein may be manufactured and used by or for the Government of the United States of America for governmental purposes without the payment of any royalties thereon or therefor.

This invention relates to a wind tunnel or induction type air blast, wherein rapid flow of air is induced for test purposes and the like.

Wind tunnels of the induction type usually comprise a nozzle wherein forced injection of compressed gas induces flow of air in the tunnel. The gas just mentioned may be air, steam, combustion products, or a mixture of these, forced under pressure to the nozzle, where it induces flow of atmospheric air through the tunnel. The present invention aims to increase the mass flow of said gas without greatly increasing the power requirements of the compressors which force it to the nozzle. This is accomplished by the use of burners which add their products of combustion to the gas, and by the injection of water which is vaporized by the heat generated by the burners and thereby cools the gas. The result is that considerable mass is added to the gas flow without correspondingly increasing the load on the compressors.

An object of the present invention is to provide an improved apparatus of the type above outlined.

Other objects and many of the attendant advantages of this invention will be readily appreciated as the same becomes better understood by reference to the following description.

In the drawing, the single figure is a diagram of apparatus embodying the invention.

The apparatus shown in the drawing comprises a wind tunnel having a flared inlet 10, a cylindrical test section 12 which as shown contains an element 14 to be tested, a nozzle section described hereinafter, and a tapered outlet section 16. A battery of air compressors is indicated at 18, the outlet conduit 20 thereof connecting with a combustion chamber 22, which in turn is connected to the nozzle section by a conduit 24.

The nozzle section comprises a tapered extension 26 of the test section, related telescopically to the outlet section 16, and an annular chamber 28 formed as an extension of the outlet section, receiving gases from conduit 24 and discharging them through an annular outlet 30 formed between elements 26 and 16 and forming therewith a species of Venturi. Passage of gases through said outlet acts, in accordance with known principles, to induce a flow of air through the wind tunnel.

In order to increase the mass flow through conduit 24, a burner 32 is disposed at the entrance to the combustion chamber, being supplied with fuel from a reservoir 34. Posterior to burner 32 a plurality of atomizing nozzles 36 spray water into the combustion chamber, being supplied from a pressure reservoir 38. The rate of supply of fuel and water to burner 32 and nozzles 36 is controlled by valves 40 and 42.

In the operation of the device, the compressors 18 are started, valves 40 and 42 are opened, and burner 32 lighted. Atmospheric air is compressed at 18 and passes through conduit 20. Upon passing burner 32, most of the oxygen of said air is consumed, being replaced by combustion products. Nozzles 36 spray water into the gaseous mixture in such quantities as to reduce its temperature to the desired value and also to materially increase the mass of the mixture. The mixture then passes to the nozzle section, where it induces flow through the wind tunnel.

Introduction of water in the manner just described has advantages over introduction of steam from a boiler, since a boiler is costly compared to a burner, and the boiler requires large quantities of pure water which cannot be recovered by condensation. The present apparatus can utilize water having a high content of impurities.

Use of the present invention substantially reduces the power required at the compressors, for a given rate of mass flow through conduit 24 and through the wind tunnel.

Obviously many modifications and variations of the present invention are possible in the light of the above teachings. It is therefore to be understood that within the scope of the appended claims the invention may be practiced otherwise than as specifically described.

What is claimed is:

1. In a wind tunnel, a tubular section, an annular chamber formed at one end of said section and having an annular outlet opening thereto, a tubular test section having an inlet opening to atmosphere and an outlet end traversing said chamber and forming with said outlet opening a constricted annular Venturi, a conduit supplying gases under pressure to said chamber and said Venturi to induce flow of air through said test section, a combustion chamber in said conduit, means for supplying air under pressure to said combustion chamber, a burner in said combustion chamber, and means for spraying water into said combustion chamber posterior to said burner.

2. In a wind tunnel, a tubular section having at one end an annular chamber formed with an annular outlet opening to said tubular section, a tubular test section having an inlet opening to atmosphere and an outlet end forming with said outlet opening a constricted annular Venturi, a conduit supplying gases to said chamber and annular outlet to induce flow of air through said test section, a combustion chamber in said conduit, a burner in said combustion chamber, and means for supplying water to said combustion chamber posterior to said burner.

References Cited in the file of this patent

UNITED STATES PATENTS

| | | |
|---|---|---|
| 2,309,938 | Diserens | Feb. 2, 1943 |
| 2,424,654 | Gamble | July 29, 1947 |
| 2,515,069 | Zola | July 11, 1950 |
| 2,551,229 | Alford et al. | May 1, 1951 |
| 2,592,322 | Nerad | Apr. 8, 1952 |

FOREIGN PATENTS

| | | |
|---|---|---|
| 638,052 | Great Britain | May 31, 1950 |